Feb. 20, 1923.
H. C. WARD.
SNOWPLOW FOR AUTOMOBILES.
FILED DEC. 8, 1920.
1,446,363.
2 SHEETS—SHEET 1.
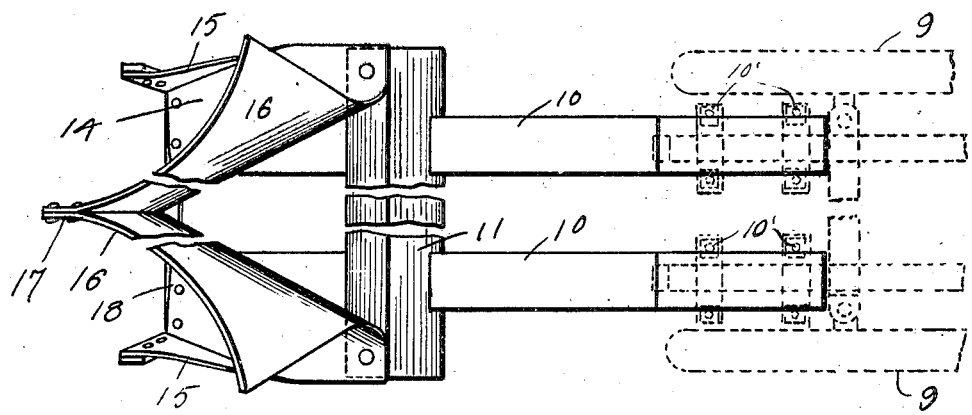
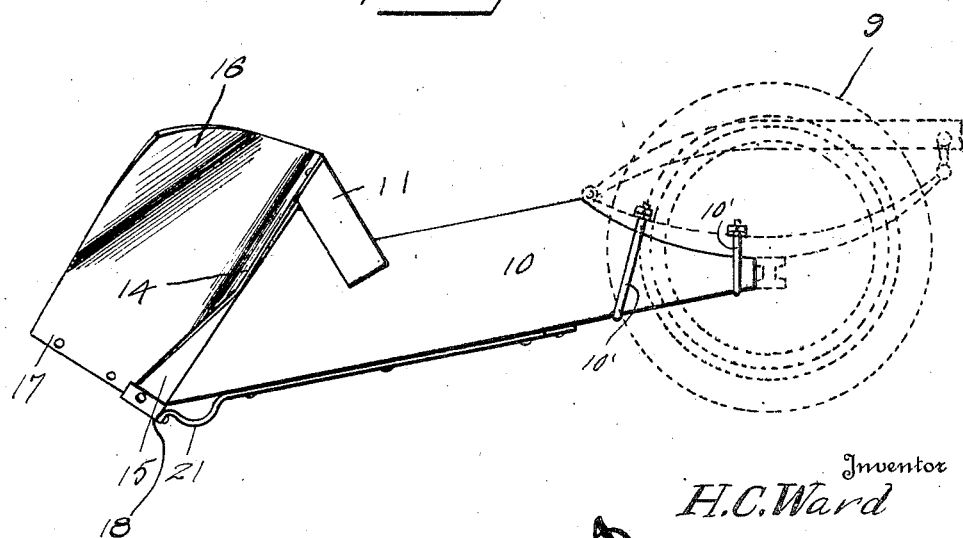
Inventor
H. C. Ward Patented Feb. 20, 1923.

1,446,363

UNITED STATES PATENT OFFICE.

HENRY C. WARD, OF CANON CITY, COLORADO.

SNOWPLOW FOR AUTOMOBILES.

Application filed December 8, 1920. Serial No. 429,144.

*To all whom it may concern:*

Be it known that I, HENRY C. WARD, a citizen of the United States, residing at Canon City, in the county of Fremont and State of Colorado, have invented certain new and useful Improvements in Snowplows for Automobiles; and I do hereby declare the following to be a full, clear, and exact description of the invention, such as will enable others skilled in the art to which it appertains to make and use the same.

The object of the invention is to provide a simple and efficient snow plow or track cleaning attachment for motor cars such as automobiles, for progressively clearing a track or path in advance of the car and discharging the snow laterally to afford a free passage for the wheels of the car; and more particularly to provide a device for the purpose indicated which may be readily applied to and removed from the car and may be used without straining or causing injury thereto; and with these objects in view the invention consists in a construction and combination of parts of which a preferred embodiment is shown in the accompanying drawings, wherein:

Figure 1 is a plan view of a snow plow attachment applied in the operative position to a vehicle of the automobile type.

Figure 2 is a side view of the same,

Figure 3 is a front view,

Figure 4 is a bottom plan view thereof.

The attachment is adapted to be arranged at the forward end of a motor vehicle 9 and consists essentially of a pair of runners or supporting members 10 that have their rear portions shaped to conform to the front spring of the vehicle and are secured thereto by clamps 10'. The clamps 10' support the members or runners 10 in a forwardly inclined position and with their rear ends in abutting engagement with the front axle. The runners or members 10 are connected by a transverse bar 11 and carry at their forward ends a shovel 12 which is disposed in a downwardly and forwardly inclined position so as to position the forward edge thereof adjacent to the surface to be traversed.

The shovel in addition to the lateral wings 14 which are provided with side fenders 15 embodies the deflecting wings 16 which are convergently disposed downwardly and are united to provide a front cutting or dividing edge 17 which is inclined upward toward its front end to afford a shearing action upon the surface of the snow so as to readily penetrate the same in preparation for the engagement thereof by the transverse edge 18 at the lower ends of the lateral wings, and as the snow passes upward over the surfaces of the lateral wings, confined at the outer edges thereof by the fenders 15, it is moved laterally by the deflecting wings and is discharged at opposite sides of the path of the car to leave an unobstructed track for the latter.

In order that the lower scooping edge of the shovel may operate close to the surface of the ground without coming in contact therewith, the runners are preferably provided with shoes 20 having downwardly deflected rounded bearing portions 21 adjacent to and in rear of the edge of the shovel and adapted to accurately follow any irregularities in the surface of the roadway traversed.

Inasmuch as the pushing of the plow is effected directly from the front axle of the car the likelihood of straining or otherwise injuring the car is reduced to the minimum and at the same time the tendency is always to press the forward or scooping edge of the shovel downward and thus hold it effectively to its work in raising and laterally transferring the snow so as to open a path for the machine.

Having thus described the invention, what I claim is:—

1. A snow plow comprising supporting beams cut adjacent their rear ends to conform to the curvature of the front springs of a vehicle and adapted to be clamped to said springs with their rear ends abutting the front axle of the vehicle, runners having rounded resilient ground engaging portions secured to the lower side of said beams adjacent their front ends, and plow blades secured to the front end of said beam and adapted to deflect snow to either side thereof.

2. A snow plow comprising supporting beams cut adjacent their rear ends to conform to the curvature of the front springs of a vehicle and adapted to be clamped to said springs with their rear ends abutting the front axle of the vehicle, runners having rounded resilient ground engaging portions secured to the lower side of said beams adjacent their front ends, and plow blades secured to the front ends of said beams and adapted to deflect snow to either side thereof, said plow blades comprising a pair of upwardly and oppositely deflected members secured together at their adjacent edges and having the adjacent edges extend upwardly and forwardly to provide a cutting blade, and the outer edges of said members being upwardly deflected to provide means whereby the snow is deflected further to either side of the blades.

In testimony whereof I affix my signature in presence of two witnesses.

HENRY C. WARD.

Witnesses:
   T. V. HODGIN,
   M. BLANCHE BENSON.